United States Patent [19]
Chou

[11] Patent Number: 6,150,618
[45] Date of Patent: Nov. 21, 2000

[54] AUTOMATIC TESTING DEVICE

[75] Inventor: Chin Chun Chou, Taiping, Taiwan

[73] Assignees: Yeu Ming Tai Chemical Industrial Co., Ltd.; Precision Machinery Research & Development Center, both of Taiwan

[21] Appl. No.: 09/262,291

[22] Filed: Mar. 4, 1999

[51] Int. Cl.[7] .......................... G01G 19/02; G01G 23/00
[52] U.S. Cl. ............................................. 177/145; 177/245
[58] Field of Search ..................................... 177/145, 245

[56] References Cited

U.S. PATENT DOCUMENTS

| | | | |
|---|---|---|---|
| 4,415,048 | 11/1983 | Teraoka | 177/245 |
| 4,426,006 | 1/1984 | Horii et al. | 177/145 |
| 5,064,009 | 11/1991 | Melcher et al. | 177/145 |
| 5,115,874 | 5/1992 | Hayahara et al. | 177/145 |
| 5,115,876 | 5/1992 | Chang et al. | 177/145 |

*Primary Examiner*—Randy W. Gibson
*Attorney, Agent, or Firm*—Charles E. Baxley

[57] ABSTRACT

A testing device includes a housing having a number of openings formed in a partition for receiving a number of cups. The housing includes an x-axis track, a y-axis track and a z-axis track. A scale is moved along the x-axis track and the y-axis track of the housing to a position below the cups and is elevated to move the cups upward and to measure the changes of the weight of the cups in a suitable time interval. The cups may receive the desiccating agent, water or the plants whose weight are required to be measured frequently.

8 Claims, 3 Drawing Sheets

6,150,618

AUTOMATIC TESTING DEVICE

BACKGROUND OF THE INVENTION

1. Field of the Invention

The present invention relates to a testing device, and more particularly to an automatic testing device.

2. Description of the Prior Art

Typical testing devices include a number of cups for receiving the materials to be tested, for example. The cups will then be disposed in an enclosed environment to be tested and may be measured and recorded manually at a suitable time interval. However, the testing persons should enter into and exit from the environment each time when measuring and recording the weight of the cups, for example. However, the conditions in the environment may be changed each time when the testing persons enter into and exit from the environment. In addition, it is time consuming for the testing persons to test and to record the changes of the materials received in the cups.

The present invention has arisen to mitigate and/or obviate the afore-described disadvantages of the conventional testing devices.

SUMMARY OF THE INVENTION

The primary objective of the present invention is to provide a testing device which may test and measure and record the changes of the cups automatically.

In accordance with one aspect of the invention, there is provided a testing device comprising a housing including a number of openings formed in a partition for receiving a number of cups, and including an x-axis track, a y-axis track and a z-axis track. A scale is moved upward to measure the weight of the cups.

The housing includes a pair of rods rotatably received therein, a pair of endless belts engaged on the rods for forming the x-axis track of the housing, and means for driving the endless belts. The y-axis track includes a pair of blocks secured to the belts and moved in concert with the belts, a bolt rotatably secured between the blocks for forming the y-axis. The housing includes a casing slidably engaged on and threaded with the bolt, and means for rotating the bolt in order to move the casing along the bolt. The casing includes a second bolt vertically disposed therein, the scale is secured on the second bolt, and means for moving the second bolt up and down to engage the scale with the cups and to disengage the scale from the cups.

The cups each includes an upper peripheral groove, a sheet member engaged on top of the cup, and means for securing the sheet member on the cup. The securing means for the sheet member is a clamping ring engaged in the peripheral groove of the cup.

The partition includes a number of peripheral edges for defining the openings of the partition, and includes a number of gaskets engaged on the peripheral edges for engaging with the cups.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
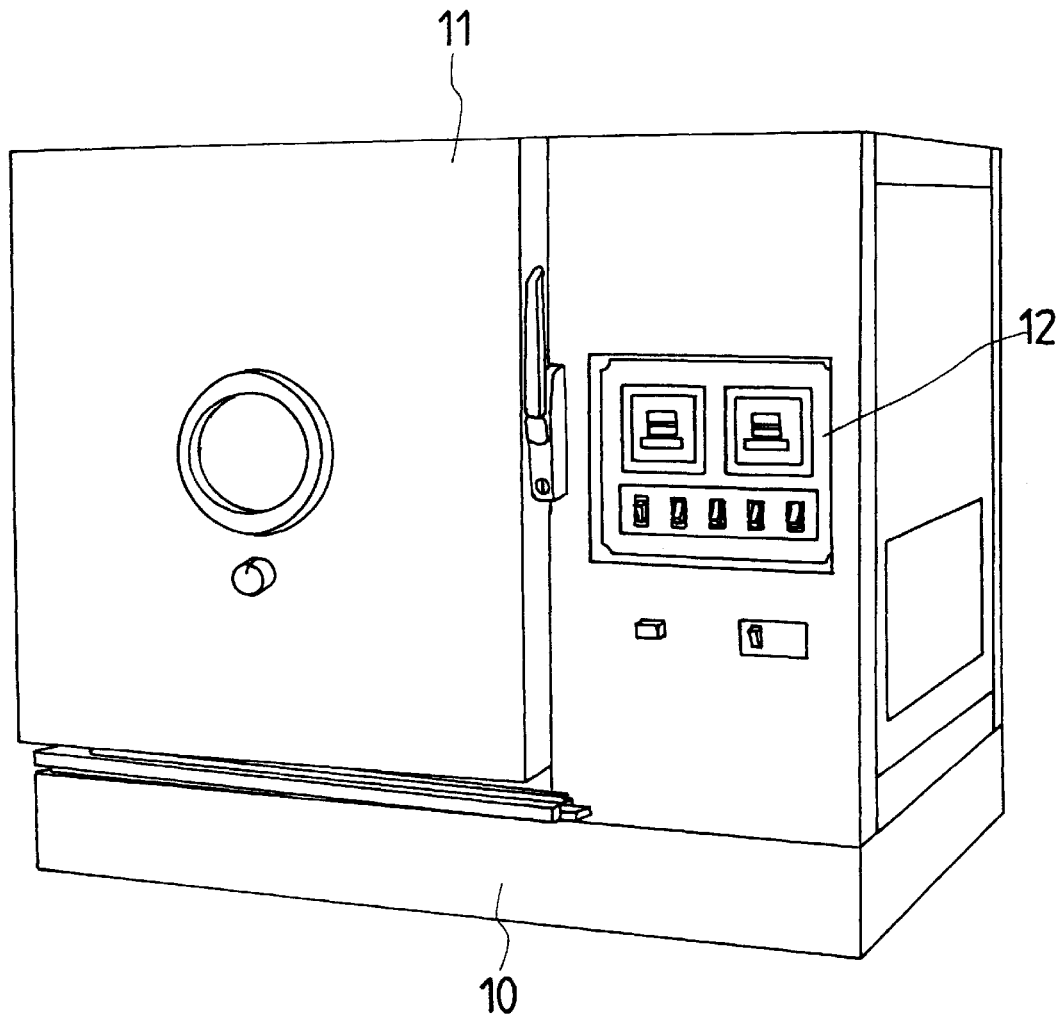
FIG. 1 is a perspective view of a testing machine having a testing device in accordance with the present invention.
Figure 2:
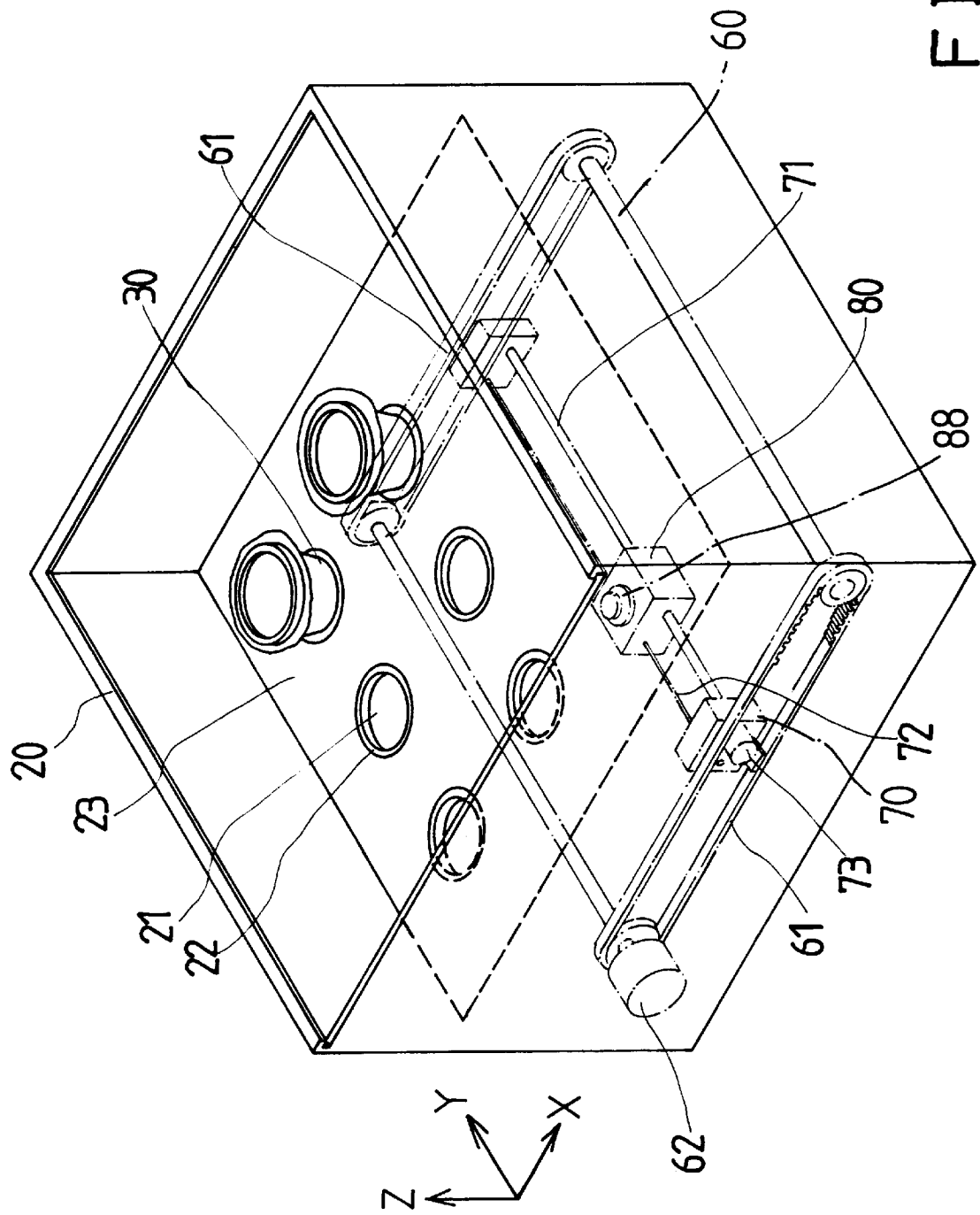
FIG. 2 is a perspective view of the testing device.
Figure 4:
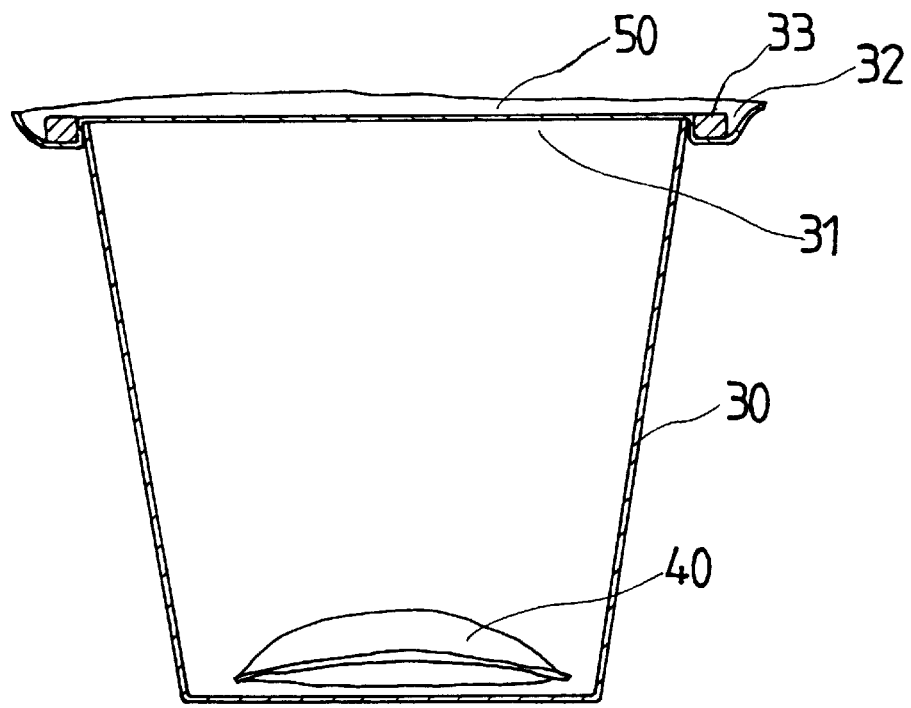
FIG. 4 is a cross sectional view of a cup for testing purposes.

Referring to the drawings, the initially to FIG. 1, a testing machine 10 includes a door 11 for enclosing and opening the machine 10 and includes a control panel 12 for controlling the testing machine 10. As shown in FIG. 2, a testing device in accordance with the present invention is to be disposed in the testing machine 10 and comprises a housing 20 having a partition 23 formed in the middle portion. The partition 23 includes a number of openings 21 formed therein and a number of sealing rings or gaskets 22 engaged on the peripheral edges that define the openings 21 of the partition 23. A number of cups 30 are received in the openings 21 and engaged with the gaskets 22. The chamber formed between the partition 23 and the bottom of the housing 20 may be enclosed when the cups 20 are engaged in all of the openings 21. The cups 30 each includes an object 40 (FIG. 4) to be tested therein, such as the desiccating agent or the water or the plant whose weight may be changed. The cups 30 each includes an open top 31 enclosed with a sheet member 50 which is made of a testing or chemical material that may be changed due to different wetness and which may be made by the typical test paper. The cups 30 each includes a peripheral groove 32 formed in the upper portion for receiving a clamping ring 33 which may secure the testing sheet member 50 in place.

As shown in FIG. 2, a pair of rods 60 are rotatably secured in the housing 20 and a pair of endless belts 61 are engaged on the rods 60 and arranged in parallel to the x-axis of the housing 20. A motor 62 is coupled to one of the rods 60 for driving the belts 61 which form an x-axis track for the housing 20. Two blocks 70 are secured to the belts 61 respectively and moved in concert with the belts 61. A bolt 71 is rotatably secured between the blocks 70 and a pole 72 is secured between the blocks 70. The bolt 71 and the pole 72 are arranged in parallel to a y-axis of the housing 20 and form a y-axis track. A motor 73 is coupled to the bolt 71 for rotating the bolt 71. A casing 80 is slidably engaged on the pole 72 and is threaded with the bolt 71 such that the casing 80 may be moved along the bolt 71 or along the y-axis when the bolt 71 is rotated by the motor 73.

Figure 3:
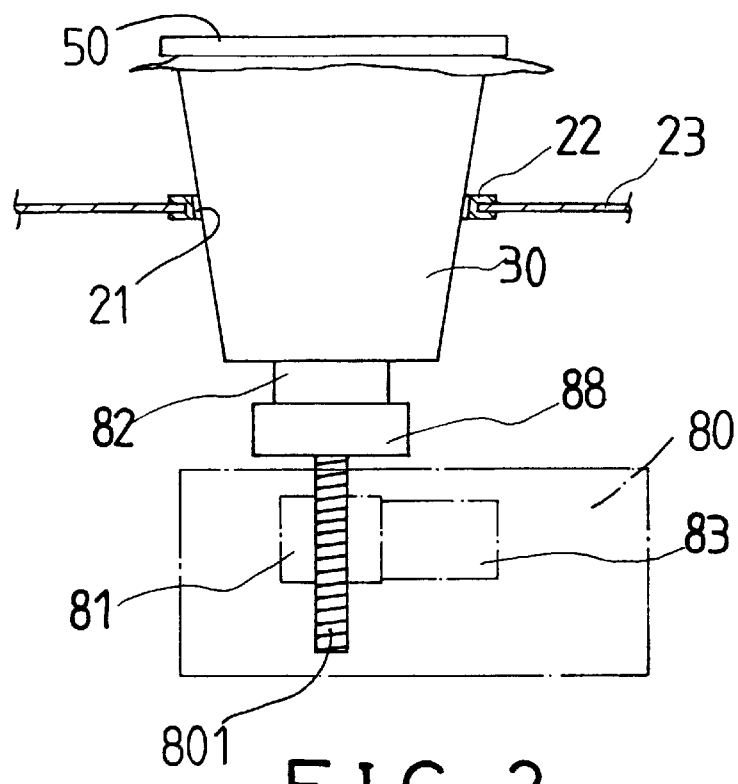
FIG. 3 is a schematic view illustrating the operation of the testing device.

Referring next to FIG. 3, a nut or a worm or the like 81 is rotatably secured in the casing 80. A motor 83 is coupled to the nut 81 for driving and for rotating the worm 81. A bolt or the like 801 is slidably received in the casing 80 and is threaded with the nut 81 such that the bolt 801 may be caused to move up and down or to move along the z-axis by the bolt 801 when the nut 81 is rotated by the motor 83. The bolt 801 thus form a z-axis track for the housing 20. A scale 88 is secured on top of the bolt 801 and includes a projection 82 extended upward therefrom for engaging with the cups 30. It is preferable that the projection 82 includes a size smaller than that of the bottom of the cups 30. The motors 62, 73, 83 may be controlled by a computerized program of a processing unit of the testing machine 10.

In testing, the desiccating agent 40 may absorb the wet or the humidity in the housing 20 or in the testing machine 10, such that the weight of the desiccating agent 40 and thus of the cup 30 may be changed. Or, when water is received in the cups 30, the water may evaporate such that the weight of the cups 30 may also be changed. Or, when one or more plants are planted in each of the cups 30, the growth of the plants may change the weight of the plants such that the measured weight of the cups 30 may also be changed.

In operation, the scale 88 may be moved to the bottom portions of the cups 30 and may be elevated to move the cups 30 upward and to disengage the cups 30 from the partition 23 such that the weight of the cups 30 may be measured and recorded in the processing unit of the testing machine 10. The scale 88 may be moved to measure the weights of the required cups 30 at a suitable time interval, such that the changes of the weights of the cups 30 may be easily measured and recorded.

Accordingly, the testing device in accordance with the present invention may be used for testing and measuring and recording the changes of the cups automatically.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A testing device comprising:

a housing including a partition provided therein and having a plurality of openings formed therein, and including an x-axis track, a y-axis track and a z-axis track provided therein, a plurality of cups received in said openings of said partition, a scale disposed in said housing, means for moving said scale along said x-axis track and said y-axis track of said housing to a position below said cups, and means for moving said scale upward to measure a weight of said cups.

2. The testing device according to claim 1, wherein said housing includes a pair of rods rotatably received therein, a pair of endless belts engaged on said rods for forming said x-axis track of said housing, and means for driving said endless belts.

3. The testing device according to claim 2, wherein said y-axis track includes a pair of blocks secured to said belts and moved in concert with said belts, a bolt rotatably secured between said blocks for forming said y-axis.

4. The testing device according to claim 3, wherein said housing includes a casing slidably engaged on and threaded with said bolt, and means for rotating said bolt in order to move said casing along said bolt.

5. The testing device according to claim 4, wherein said casing includes a second bolt vertically disposed therein, said scale is secured on said second bolt, and means for moving said second bolt up and down to engage said scale with said cups and to disengage said scale form said cups.

6. The testing device according to claim 1, wherein said cups each includes an upper peripheral groove formed therein, a sheet member engaged on top of said cup, and means for securing said sheet member on said cup.

7. The testing device according to claim 6, wherein said securing means for said sheet member is a clamping ring engaged in said peripheral groove of said cup.

8. The testing device according to claim 1, wherein said partition includes a plurality of peripheral edges for defining said openings of said partition, and includes a plurality of gaskets engaged on said peripheral edges for engaging with said cups.

* * * * *